United States Patent [19]

Pellow et al.

[11] Patent Number: 4,960,441
[45] Date of Patent: Oct. 2, 1990

[54] SINTERED ALUMINA-ZIRCONIA CERAMIC BODIES

[75] Inventors: Scott W. Pellow; Ronald W. Trischuk, both of Niagara Falls; Christopher E. Knapp, Hamilton; Ralph Bauer, Niagara Falls, all of Canada

[73] Assignee: Norton Company, Worcester, Mass.

[21] Appl. No.: 192,277

[22] Filed: May 9, 1988

Related U.S. Application Data

[63] Continuation-in-part of Ser. No. 175,802, Mar. 31, 1988, abandoned, which is a continuation-in-part of Ser. No. 48,175, May 11, 1987, abandoned.

[51] Int. Cl.$^5$ .............................................. B24D 3/00
[52] U.S. Cl. ........................................ 51/293; 51/309
[58] Field of Search .................................. 51/293, 309

[56] References Cited

U.S. PATENT DOCUMENTS

| | | | |
|---|---|---|---|
| 3,079,243 | 2/1963 | Ueltz et al. | 51/298 |
| 3,181,939 | 5/1965 | Marshall et al. | 51/309 |
| 3,387,957 | 6/1968 | Howard | 51/298 |
| 3,454,385 | 7/1969 | Amero | 51/298 |
| 3,481,723 | 12/1969 | Kistler et al. | 51/298 |
| 3,607,162 | 9/1971 | Bocksliegel et al. | 51/293 |
| 3,679,383 | 7/1972 | Hack et al. | 51/309 |
| 3,831,857 | 8/1974 | Scott | 239/424 |
| 3,891,408 | 6/1975 | Rowse et al. | 51/295 |
| 4,218,253 | 8/1980 | Dworak et al. | 106/43 |
| 4,298,385 | 11/1981 | Claussen et al. | 501/105 |
| 4,314,827 | 2/1982 | Leitheiser et al. | 51/298 |
| 4,316,964 | 2/1982 | Lange | 501/105 |
| 4,457,767 | 7/1984 | Poon et al. | 51/298 |
| 4,565,792 | 1/1986 | Knapp | 501/104 |
| 4,623,364 | 11/1986 | Cottringer et al. | 51/309 |
| 4,666,467 | 5/1987 | Matsumoto et al. | 51/309 |
| 4,690,692 | 9/1987 | Hesse et al. | 51/293 |

FOREIGN PATENT DOCUMENTS 152768 8/1985 European Pat. Off.
257969 2/1988 European Pat. Off.

OTHER PUBLICATIONS

Influence of Cr and Fe on Formation of (alpha) $Al_2O_3$ from (gamma)-$Al_2O_3$, G. C. Bye and G. T. Simpkin, Journal of the American Ceramic Society, vol. 57, No. 8, pp. 367–371, Aug. 1974.

The Effect of $Cr^{3+}$ and $Fe^{3+}$ Ions on the Transformation of Different Aluminum Hydroxides to (alpha) $Al_2O_3$, T. Tsuchida et al., Thermochimica Acta, 64 (1983) pp. 337–353.

Alpha Alumina Formation in $Al_2O_3$ Gels by F. W. Dynys and J. W. Halloran (Chapter 11), Proceedings of the International Conference, Ultrastructure Processing of Ceramics, Glasses and Composites, Feb. 11–17, 1983.

Alpha Alumina Formation in Alum-Derived Gamma Alumina, by F. W. Dynys and J. W. Halloran, Journal of the American Ceramic Society, vol. 65, No, 9, pp. 442–448.

Primary Examiner—Paul Lieberman
Assistant Examiner—Willie J. Thompson
Attorney, Agent, or Firm—Arthur A. Loiselle, Jr.

[57] ABSTRACT

Useful ceramic bodies can be made by mixing zirconia powder with seeded alumina gel, drying, and firing at a high enough temperature to convert the alumina in the gel to microcrystalline alpha alumina. Abrasive grits made in this way, with a zirconia content between 15 and 30 weight percent and at least half the zirconia in the tetragonal crystal form are particularly valuable for use in grinding wheels for snagging steels.

37 Claims, 2 Drawing Sheets

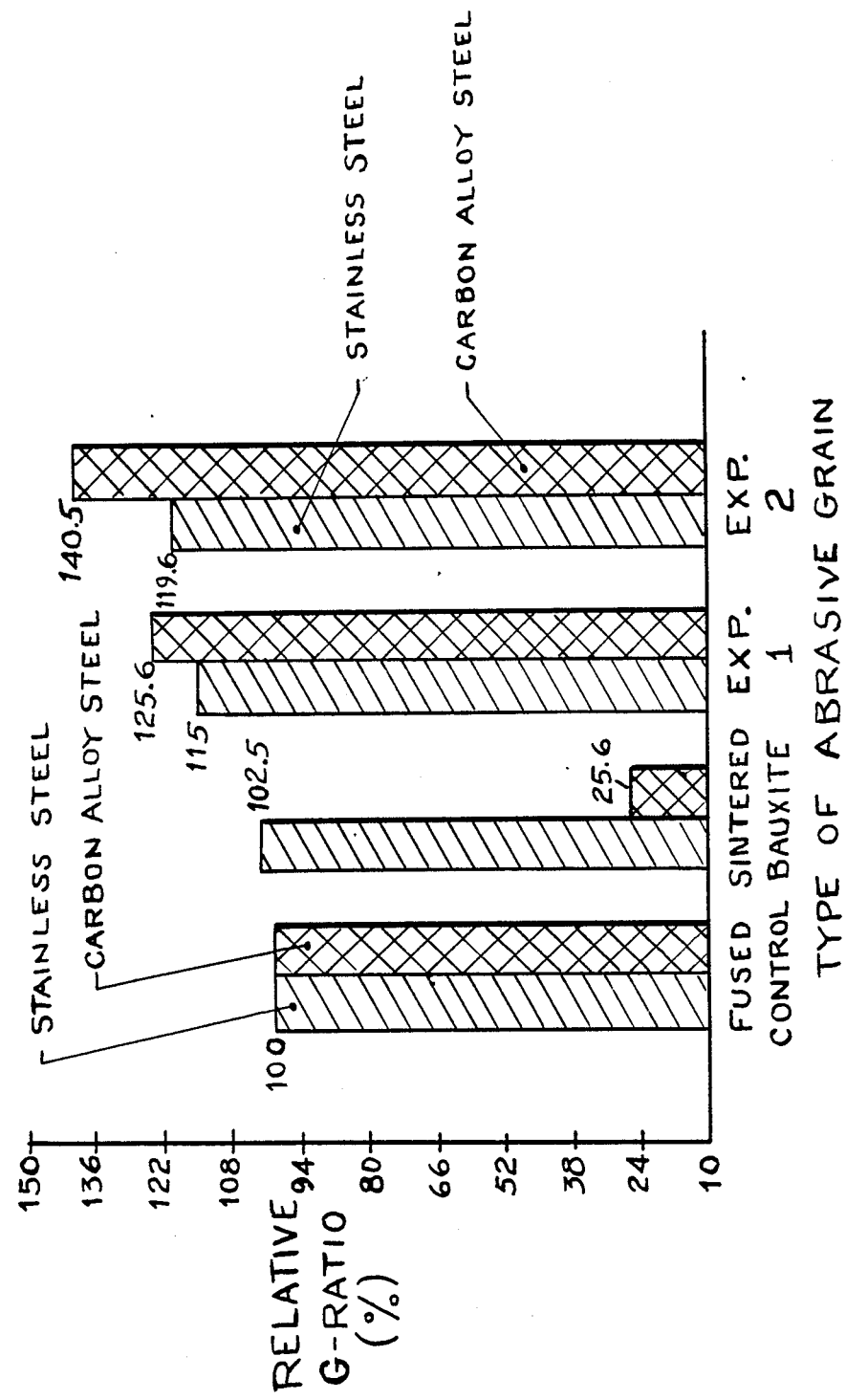

SINTERED ALUMINA-ZIRCONIA CERAMIC BODIES

CROSS-REFERENCE TO RELATED APPLICATION

This application is a continuation-in-part of copending application Ser. No. 07/175,802, filed Mar. 31, 1988, which was a continuation-in-part of application 07/048,175, filed May 11, 1987 both are now abandoned.

BACKGROUND OF THE INVENTION

Most ceramic bodies of alumina-zirconia are made by mixing finely ground or milled powders of alumina and zirconia, pressing to give a green body, and firing the green body to give a strong final body. Alumina from a wide variety of sources has been used. On the other hand, most manufactured alumina-zirconia abrasive grits are made by fusing zirconia and alumina together, then solidifying, often with special stratagems to produce very rapid cooling.

Most manufactured aluminous abrasive is made by fusing aluminum oxide with or without the addition of zirconia and with varying degrees of purity, depending upon the desired application.

Starting with the introduction of sintered bauxite in 1966 (U.S. Pat. No. 3,079,243), for use in heavy duty grinding of stainless steel, a minor but significant fraction of commercial aluminous abrasive began to be made by sintering rather than by fusion. Such sintered abrasive was used primarily for stainless steel snagging. As of 1960, a major difference between the fused and the sintered abrasives was that the sintered abrasive grits were microcrystalline, thus of enhanced toughness and fracture resistance. Although a small amount of fused alumina known prior to 1960 was rapidly quenched to produce polycrystalline grits, the majority of the fused alumina was in the form of grits in which each grit was made up of from 1 to 3 crystals (or parts of crystals) depending upon the grit size.

In the 1960's the fused alumina-zirconia alloy abrasives were introduced (U.S. Pat. No. 3,181,939). Such abrasives were, like the 1960 sintered abrasives, truly polycrystalline, thus having enhanced toughness and fracture resistance. Subsequently some patents were published covering sintered alumina zirconia, i.e. U.S. Pat. Nos. 3,481,723, 3,679,383 and 3,454,385.

In the early 1980's a new aluminous sintered abrasive made from alumina gel was introduced as taught in U.S. Pat. No. 4,314,827. Such abrasive contains about 5% of magnesia which forms a polycrystalline matrix phase surrounding cellular 5 to 10 micron sized alumina crystals. Such abrasive has been employed in coated abrasive belts and discs to provide high quality performance. The same patent also discloses a different aluminous abrasive, made by sintering alumina gel mixed with zirconia. Such abrasive has not been offered commercially and according to the data of the patent is inferior to the MgO containing abrasive.

Recently a different sintered abrasive made from alumina gel was described in European published patent application EP-152768 and U.S. Pat. No. 4,623,364. In these disclosures, very fine alpha alumina seed particles are added to an alpha alumina precursor gel to produce a fine and dense alpha alumina structure on sintering, without the need for MgO or other additions. The documents teach that such alumina may serve as a matrix for other ceramic materials such as zirconia. Other references that are related to use of seeded gels are:

*The Effect of $Cr^{3+}$ and $Fe^{3+}$ Ions on the Transformation of Different Aluminum Hydroxides to (alpha)-$Al_2O_3$*, T. Tsuchida et al., Thermochimica Acta, 64 (1983) 337–353. This article discusses the effects of additions of chromium and iron ions to boehmite, pseudoboehmite and bayerite. The article notes on page 350 that the addition of $Cr^{3+}$ ions to bayerite reduces the temperature at which the material converts to alpha alumina and explains this on the basis that the chromium ions crystallize as alpha $Cr_2O_3$, and acts as active nuclei for the transformation of the alumina to alpha alumina. The article further states on page 352 and 353 that the iron ions crystallize as alpha $Fe_2O_3$ and act as active nuclei for the transformation of the alumina to alpha alumina. The article says nothing about the crystal structure of the resulting alpha alumina. It bases its conclusion concerning nucleation on the fact that the additions of the chromium and iron ions act to reduce the temperature of transition to alpha alumina in the situations mentioned above.

*Alpha alumina Formation in $Al_2O_3$ Gels by F. W. Dynys and J. W. Halloran*, "Proceedings of the International Conference, Ultrastructure Processing of Ceramics, Glasses and Composites" held Feb. 11–17, 1983 in Gainesville, Fla., Chapter 11, F. W. Dynys and J. W. Halloran, J. Wiley & Sons, Inc. 1984. This article discusses the effect of additions of $Cr_2O_3$ and $Fe_2O_3$ on colloidal suspensions of pseudoboehmite. The article notes that the additions of $Cr_2O_3$ and $Fe_2O_3$ in concentrations of greater than 2 wt. % enhanced the transformation rate to alpha alumina. The article notes that during annealing of the dried gel the alpha alumina colonies which formed in the material consisted of vermicular shaped particles separated by large elongated pores. As the gels are annealed for longer times, the vermicular alpha alumina rapidly grew and dominated the microstructure. It states on page 148 that the microstructures of gels doped with MgO, $Cr_2O_3$, and $Fe_2O_3$ were indistinguishable from those of undoped gels.

*Alpha Alumina Formation in Alum-Derived Gamma Alumina*, by F. W. Dynys and J. W. Halloran, Journal of the American Ceramic Society, Vol. 65 No. 9 p. 442. The article describes the results of research into the formation of alpha alumina in gamma alumina during sintering. The gamma alumina powder was treated in various ways such as die pressing and dry ball milling with alpha alumina milling media. The article observes on page 443 and 444 that the transformation from gamma to alpha alumina was more rapid for the gamma alumina powder which had been ball milled. To determine whether the alpha alumina milling debris acted as heterogeneous nuclei in the conversion of the gamma alumina to alpha, distilled water was milled for a period sufficient to produce an adequate amount of milling debris. The debris, which was largely alpha alumina, was collected by drying. The gamma alumina powder was doped with 1 percent of the milling debris and pressed. The weight versus time data for the doped powder was indistinguishable from that of the untreated powder which had no milling debris added, thus the article concludes that the debris had no affect on transformation and that the debris particles did not act as a seed for the crystallization of alpha alumina.

The article goes on to discuss on pages 446 and 447 the results of examining the annealed gamma alumina compacted powder which had been fired sufficiently to partially convert the gamma alumina to alpha. The article notes on page 447 that although the alpha particles are the same size as those in the unmilled powder the alpha colonies are much finer than those in the unmilled powder and that the nucleation frequency for the milled powder was dramatically increased by the milling operation.

The article goes on to state on the second column of page 447 that the mechanism by which the nucleation frequency is increased by ball milling is not obvious and that it had been demonstrated that the alpha alumina debris from the milling media is not responsible for the effect.

*Influence of Cr and Fe on Formation of (alpha)-$Al_2O_3$ from (gamma)-$Al_2O_3$* by G. C. Bye and G. T. Simpkin. Journal of the American Ceramic Society, Vol. 57, No. 8, Pgs. 367–371, August 1974. The article reports the results of investigations into the influence of chromia and iron on the formation of alpha alumina. It notes on page 368 that the presence of $Fe^{3+}$ ions in the gamma alumina accelerated the conversion to alpha alumina. On page 370, column 2 the article suggests that this is the case because the $Fe^{3+}$ ion acts to decrease the crystallinity of the intermediate delta-$Al_2O_3$ and possibly by the segregation of nuclei of alpha-$Fe_2O_3$ but notes that the alpha-$Fe_2O_3$ was not detected by X-ray diffraction. The article goes on the say that the formation of alpha-$Al_2O_3$ involves either, (a) steps of sintering followed by synchro-shear, or, (b) a process of nucleation and growth, and states that the evidence supports the synchro-shear mechanism.

U.S. Pat. No. 3,387,957, issued June 11, 1968 to E. E. Howard describes a method for making alpha alumina abrasive grain by sintering calcined bauxite. The calcined bauxite is initially about ¾ inch and finer in size and is milled in either a ball mill with alumina balls or a laboratory mill using either steel or alumina grinding media, to form a slurry. The slurry is dried to a cake and pulverized into agglomerates of finely ground microscopic particles. The pulverized material is then thoroughly mixed with a binder and extruded to produce solid cylindrical rods that are cut into grain sized pieces, dried and fired. Microscopic analysis of several grains showed that they were made up of microcrystalline particles on the order of five microns in size. The patent notes in the example described in column 6 that the calcined bauxite was milled for 100 hours in a rotary ball mill using cylindrical alumina balls and that the chemical composition of the material was changed somewhat as a result of the attrition of the alumina grinding media and the lining of the mill. The patent goes on to state that the composition following the milling was not significantly changed.

Since calcined bauxite is normally already alpha alumina, the sintering of the milled material described in the Howard patent does not convert a precursor alumina to alpha alumina but merely consolidates already existing alpha alumina. Additionally, the slurry formed by the milling described in the Howard patent is not a gel and the patent does not describe any sol gel process. There is no suggestion in the patent that the attrition of alpha alumina from the milling media played any role in the process of making the abrasive grain. The patent states in passing at column 2, line 63–66, that calcined bauxite is the preferred aluminous mineral source material although uncalcined or raw bauxite ore may also be used. The patent does not describe how uncalcined bauxite would be used in the process and whether or not any preliminary calcining step would be required. The method claims of the patent are limited to the use of calcined bauxite.

While, as indicated above, various alumina-zirconia sintered abrasives have been described in the patent literature, none have to date been described or produced which are superior to their fused counterparts in overall performance in the snagging of both stainless and carbon alloy steels. Fused alumina-zirconia abrasives generally have an average crystal size of less than 0.2 microns for both the alumina and the zirconia crystals of which they are composed.

BRIEF DESCRIPTION OF THE DRAWING

FIG. 1 shows a bar graph of comparative grinding results on stainless steel and on carbon alloy steel of two examples of the abrasive grain of this invention, prior art sintered bauxite, and prior art co-fused alumina-zirconia.

DESCRIPTION OF THE INVENTION

Figure 2A:
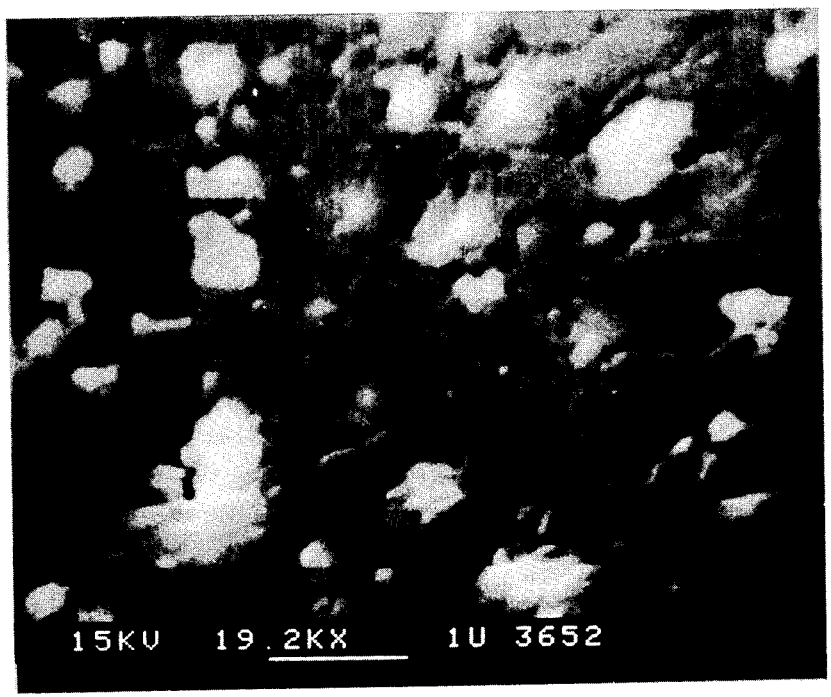
FIG. 2 comprises electron micrographs of cross-sections of product made according to the invention.

It has been found that high quality alumina-zirconia ceramic bodies can be made by mixing zirconia powder with hydrated alumina, crystalline seeds capable of facilitating the conversion of the hydrated alumina to crystalline alpha alumina upon firing, and water to form a sol, gelling the sol, shaping the gel into a green body, and heating the green body sufficiently to convert the hydrated alumina content of the green body to alpha alumina crystals.

A particularly useful type of ceramic body that can be made according to this invention is an abrasive grit. The invention will be described in more detail below primarily with respect to abrasive grits, but it is also applicable to other types of ceramic bodies such as structural materials.

It has also been found that polycrystalline abrasive grits comprising from 70 to 85 weight percent of alpha alumina and from 30 to 15 weight percent of zirconia, both in crystals of which at least three-fourths appear to have a maximum dimension between 0.3 and 1 micron when viewed in cross section in an electron micrograph at a magnification of about 10,000–15,000 X, with at least one half of the zirconia contained in the grit having the tetragonal crystal form and with the zirconia and alumina crystals well intermixed, show superior performance to previously known alumina zirconia abrasive grits in certain heavy duty grinding applications, commonly designated as "snagging", on both stainless and carbon alloy steels.

Such abrasive grits and other useful abrasive grits, may be produced by sintering pressed (as by extrusion) mixtures of seeded alumina gel and fused quenched zirconia powders. The zirconia may be a combination of the tetragonal crystal structure, stabilized by the addition of yttria or rare earth metal oxides, and the unstabilized monoclinic crystal form, or it may be 100% stabilized.

The abrasive as fired preferably should contain from 15 to 30% of zirconia, including the stabilizing yttria or cerium oxide. Minor impurities may be present in the alumina feed, the zirconia feed, and the stabilizer. Cerium oxide ore, commercially available, contains a high percentage of rare earth oxides some or all of which are effective stabilizers for the tetragonal form of zirconia at room temperature.

The stabilized zirconia is preferably produced by the air quenching of molten zirconia containing an oxide capable of stabilizing the solidified room temperature zirconia in the tetragonal crystal structure. The air aspirating nozzle of U.S. Pat. No. 3,831,857 is suitable for the air quenching of the zirconia. The molten zirconia is aspirated from a refractory nozzle, by air, into small spheres.

For use in this invention quenched spheres of zirconia stabilized with 4% yttria, and unstabilized commercially available zirconia, "ZIRCOA-A", from Zircoa Company are suitable.

The zirconia spheres are ground to a powder (less than 5 microns in size) and mixed with an alumina monohydrate sol. The sol may be formed by any of the means well known in the art, such as hydrolysis of aluminum alkoxides, but usually it is most conveniently provided by purchasing commercially available sols or by dispersing commercially available powders of alumina monohydrate, with the latter usually being preferred because it is cheaper.

Alpha alumina itself and alpha ferric oxide are known to be adequate seeds for use in this invention, with alpha alumina generally preferred. In general, the smallest practically possible seeds are preferred, but there is a theoretical lower limit, because extremely small crystals become unstable and might dissolve before they could function as seeds. In practice, seeds sufficiently small to have a specific surface area (hereinafter SSA) measured by conventional gas adsorption techniques, making use of the BET equation, of at least 39 $M^2/G$ are preferred, and seeds with an SSA of as much as 100 $m^2/g$ have been used and are still more preferred.

The seeds may be provided by any convenient technique, as described in more detail in U.S. Pat. No. 4,623,364, with the most preferred source being milling with milling media containing about 88% alpha alumina in a Sweco vibratory mill. Suitable media, in the form of cylinders with both diameter and height of about 13 mm, can be purchased from Diamonite Products, Shreve, Ohio, and a model numbers 45, 80, and 18 Sweco mills are all suitable. Milling, with the mill filled initially with only the media and water, produces, after about 24–90 hours, a suspension o mostly very fine alpha alumina crystallites in water. Any undesirably large crystallites that might be produced can be removed from the suspension by appropriate filtration, centrifugation, etc. Direct addition of an aqueous suspension prepared in this way and concentrated to about 5% alumina to a mill in which the other constituents of a sol for use according to this invention are being milled as a slurry in water is generally highly effective for dispersing the seeds substantially uniformly throughout the sol, as is preferred for achieving the most uniform properties in products according to this invention.

The best properties are generally achieved when the aggregated weight of seeds in the gel is at least 1% of the weight of the $Al_2O_3$ in alumina monohydrate when the seeds have a SSA of about 100 $m^2/g$. In general, the seeds should not form more than 10% of the weight of $Al_2O_3$ content in the final gel, and amounts from 0.6–5% of the weight of the gel are generally preferred, when using the preferred finest seeds currently known to the applicants, having an SSA of about 100 $m^2/g$. After extrusion into 2 to 10 mm diameter rods, the product is dried, crushed to short lengths, and fired. Firing at 1475° C. for ½ hour was employed in making the test abrasive referred to below. Lower or higher temperatures and more or less time may be employed. The firing should be sufficient to form a strong body, but not so long as to produce growth of the alpha alumina above 4 microns in size. A size of 3 microns and finer for the alpha alumina crystals in the fired product is preferred. The crushed extrudate may be sized by screening before and after firing.

At least 50% of the zirconia should be stabilized in the tetragonal form for the best snagging abrasives. Up to 50% monoclinic zirconia may be present. Good results can be achieved with weight ratios of 5/1 to 1/1. The zirconia may be all 100% stabilized for superior performance on carbon alloy steel but reduced effectiveness on stainless steel, compared to the 5/1 to 1/1 combination.

The practice of the invention may be further appreciated from the following non-limiting working examples.

EXAMPLE I

Stabilized zirconia for use in this example was prepared as described in U.S. Pat. No. 4,565,792 of Jan. 21, 1986 to Knapp, with 3.9–4.1 weight percent of yttria added to the zirconia (containing its natural amount of hafnia, about 2%). Before mixing, the stabilized zirconia spheres produced were ground to a particle size of 95% less than 2.0 microns as measured by a Coulter Counter. The unstabilized zirconia was commercially available Zircoa-A, available from Zircoa Company. Before mixing, this product was ground to the same specification as used for the stabilized zirconia.

0.68 kg of stabilized zirconia powder and 0.23 kg of unstabilized zirconia powder were mixed with 5.2 kg of Condea NG powder, a fine spray dried alumina monohydrate powder all capable of passing through a 325 mesh screen, and dry mixed for at least five minutes in a V-blender with a capacity of about 16 liters. A volume of 725 ml of water containing 5% by weight of alpha alumina seeds having an SSA of about 100 $m^2/g$, prepared by milling distilled water in a Model 45 Sweco mill with Diamonite 88% cylindrical alumina media with both diameter and height of about 13 mm each, was added to the mixed powders in the V-blended and mixed with them. Three additions of about 600 ml each of distilled water were then made to the mix, with 1–2 minutes of mixing after each addition and before the next one. These operations produced an alumina monohydrate sol with fine alpha alumina seeds and equal amounts of stabilized and unstabilized zirconia powders evenly dispersed therethrough.

The seeded sol was then gelled by addition of a mixture of 400 ml of concentrated nitric acid with 1800 ml of water. This mixture was added in four equal portions, with mixing for a minute or two after addition of each portion and before the next one was added. (During these additions, additional water could also be added if needed for proper viscosity. Alternatively, less water could be used to make the sol if the specific characteristics of particular lots of powder resulted in a sol with a lower viscosity than desirable when using the exact quantities specified here.) The product, after the final addition and mixing of the gelling acid, was emptied from the V-blender as gelled pellets 2–10 mm in diameter. These pellets were then fed to a conventional piston extruder (alternatively, an auger extruder could equally well be used) and extruded as short rods about 2.4 mm in diameter, dried for about 24 hours at 90° C., and broken into short lengths having an aspect ratio between 1 and 10. The drying reduced the diameter of the rods to about 1.6 mm. The broken lengths of extruded gel were then heated in a rotating Harper kiln at 1475° C. for thirty minutes to convert the balance of the alumina in the gel to finely crystalline alpha alumina.

The heated short lengths of material were graded in the conventional manner for abrasive grits and the fraction classified as grit 16, with an average size of about 1.2 mm, was used to make grinding wheels, employing a conventional phenolic resin bond with active fillers designed to be useful in high speed grinding of both stainless steels and carbon alloy steels. The wheels were 40.6 cm in diameter and 5 cm thick. Grinding with these wheels was performed at 2300 revolutions per minute, with the vertical force adjusted to keep the power level at 25 kilowatts. The results are shown in the drawing under the designation "EXP 1".

EXAMPLE II

This was performed in the same way as Example I, except that 0.455 kg of each of stabilized and unstabilized zirconia powder was used instead of the amounts specified in Example I. Grinding performance of wheels made from the product according to this example is shown in FIG. 1 under the designation "EXP 2".

EXAMPLE III

This was performed in the same way as Example I, except that 0.91 kg of stabilized and no unstabilized zirconia powder was used instead of the amounts specified in Example I. The performance of the grinding wheel made in this example was even better than that from Example II on carbon steel, but it was substantially poorer on stainless steel.

Figure 2B:
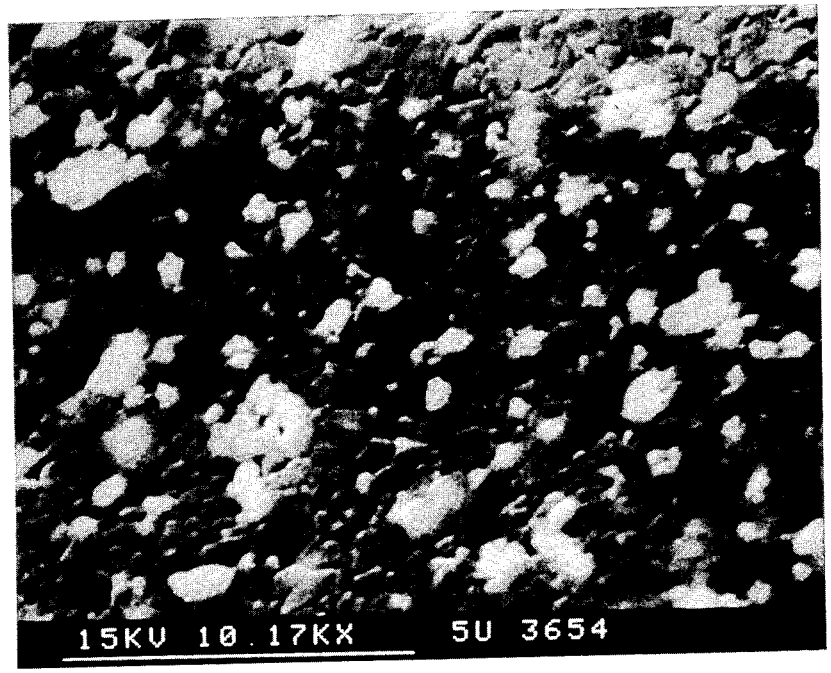

FIG. 2 shows two electron micrographs, on different scales, of cross sections of the product from Example III. FIG. 2 (a) is at 19,200 X and 2 (b) is at 10,180 X. The darker microcrystals in these pictures are alumina and the lighter ones are zirconia. Comparison of the dimensions of the individual microcrystals shown with the scale of the pictures shows that almost all the microcrystals shown, certainly more than three-fourths of them, have maximum dimensions between 0.25 and 1 micron, as claimed for this invention.

The average size of the microcrystals has been estimated by drawing diagonal lines across a copy of each of the pictures in FIG. 2, measuring the number of crystal boundaries that fall on the line, and dividing this number into the equivalent length of the diagonal line after correcting for the scale of magnification. The line from upper right to lower left in FIG. 2 (a) indicates an average grain size of 0.30 microns by this method, while the line from upper left to lower right in the same picture indicates 0.32 microns. In FIG. 2 (b) the corresponding values are 0.25 and 0.40 microns respectively. Thus the overall average grain size is 0.32 microns, well under the value of 0.5 microns which is preferred.

EXAMPLES IV-VIII

These examples were performed in the same general way as Examples I-III, except that (i) no grinding wheels were made; instead ceramic fiber bodies with a diameter of 0.6 mm were prepared; (ii) the relative amounts of zirconia and alumina were varied, instead of the relative amounts of monoclinic and tetragonal zirconia; predominantly tetragonal zirconia powder was the only type of zirconia used in these experiments. The relative proportions between alpha alumina seed materials and hydrated alumina as used in Examples I-III were maintained for Examples IV-VIII, with the amounts of water and acid for gelling varied as needed to achieve an appropriate gel viscosity for the amount of zirconia powder added to the sols. The details of composition and some physical properties of the products are shown in Table 1 below.

The extruded green bodies, after being dried, were fired for thirty minutes at the temperature shown in the Table. The three point bend strengths shown in the Table were determined by standard methods for rods, adjusted to the small diameter samples used. The hardness and fracture toughness values were determined by examining the process of diamond indentation of polished cross sections of the bodies.

TABLE 1

Physical Properties of Some Products of the Invention

| Example Number | Weight % Zirconia | Firing Temperature, C | Three Point Bending Strength GPa | Hardness GPa | Fracture Toughness, MPa m$^{0.5}$ |
|---|---|---|---|---|---|
| IV | 5 | 1450 | 0.97 | 20.0 | 4.4 |
| V | 20 | 1500 | 0.91 | 18.4 | 4.4 |
| VI | 35 | 1550 | 1.26 | 18.8 | 5.9 |
| VII | 40 | 1550 | 1.41 | 18.0 | 5.7 |
| VIII | 50 | 1550 | 1.06 | 17.8 | 5.5 |

The results in Table 1 generally indicate that strength increases with increasing zirconia content, at least up to 40%. Hardness decreases with increasing zirconia content, but fracture toughness goes up with more than about 30% zirconia. Optical microscopy on these materials showed the zirconia microcrystals were well intermixed with the alumina ones and that the average grain size was 0.76 microns for Example IV, 0.58 microns for Example VII, and 0.50 microns for Example VII.

What is claimed is:

1. A ceramic body comprising well intermixed microcrystals of alpha alumina and zirconia with at least three-fourths of said microcrystals appearing to have a maximum dimension between 0.25 and 1 micron when viewed in cross section in an electron micrograph at a magnification of about 10,000-20,000 X, said ceramic body containing from 50 to 95 weight percent of alumina and from 50 to 5 weight percent of zirconia.

2. A ceramic body according to claim 1, having a three point bend strength of at least 0.9 gigapascals.

3. A ceramic body according to claim 2, having a hardness of at least 17 gigapascals.

4. A ceramic body according to claim 3, having a fracture toughness of at least 4 megapascal (meter)$^{0.5}$.

5. A ceramic body according to claim 1, wherein said microcrystals have an average size of less than 0.5 microns.

6. An abrasive grit that is a ceramic body according to claim 1.

7. An abrasive grit according to claim 6, containing from 70-85 weight percent of alumina and from 30-15 weight percent of zirconia.

8. An abrasive grit according to claim 7, wherein said microcrystals have an average size of less than 0.5 microns.

9. An abrasive grit according to claim 8, wherein at least one half the zirconia is present in the tetragonal crystal form.

10. An abrasive grit according to claim 9, wherein at least one fifth of the zirconia contained in the grit has the monoclinic crystal form.

11. A sintered abrasive grit containing from 70–85 weight percent of alumina and 30–15 weight percent of zirconia, both the alumina and the zirconia being in the form of crystals, wherein the alumina crystals have an apparent average size of about 1 micron or less when viewed in cross section in an electron microscope at a magnification of about 10,000–20,000 X, at least one half of the zirconia contained in the grit having the tetragonal crystal form.

12. A sintered abrasive grit according to claim 11, wherein said crystals have an apparent average size of less than 0.5 microns.

13. A sintered abrasive grit according to claim 12, wherein at least one-fifth of the zirconia present is in the monoclinic crystal form.

14. A sintered abrasive grit according to claim 13, wherein at least one-fifth of the zirconia present is in the monoclinic crystal form.

15. A grinding wheel in which abrasive grits according to claim 14 are bonded by a thermoset phenolic resin.

16. A grinding wheel in which abrasive grits according to claim 13 are bonded by a thermoset phenolic resin.

17. A grinding wheel in which abrasive grits according to claim 12 are bonded by a thermoset phenolic resin.

18. A grinding wheel in which abrasive grits according to claim 11 are bonded by a thermoset phenolic resin.

19. A grinding wheel in which abrasive grits according to claim 10 are bonded by a thermoset phenolic resin.

20. A grinding wheel in which abrasive grits according to claim 9 are bonded by a thermoset phenolic resin.

21. A grinding wheel in which abrasive grits according to claim 8 are bonded by a thermoset phenolic resin.

22. A grinding wheel in which abrasive grits according to claim 7 are bonded by a thermoset phenolic resin.

23. A grinding wheel in which abrasive grits according to claim 6 are bonded by a thermoset phenolic resin.

24. A process for making ceramic bodies, comprising the steps of:

(a) mixing together to form a seeded sol (i) powdered zirconia, (ii) monohydrated alumina, (iii) water, and (iv) a sufficient amount of fine crystalline seeds to facilitate the transformation of monohydrated alumina to crystalline alpha alumina upon heating;
(b) treating the sol formed in part (a) to produce a gel;
(c) shaping the gel formed in part (b) into coherent green bodies; and
(d) heating the green bodies sufficiently to convert the monohydrated alumina content of the bodies to alpha alumina crystals, said crystals having a maximum dimension of about 1 micron or less when viewed in cross section in an electron micrograph at a magnification of about 10,000–20,000 X.

25. A process according to claim 24, wherein said amount of fine crystalline seeds is no more than 10 weight percent of the alumina content of the monohydrated alumina in the sol.

26. A process according to claim 25, wherein said amount of fine crystalline seeds is at least 0.6 weight percent of the alumina content of the monohydrated alumina in the seeded sol.

27. A process according to claim 26, wherein said fine crystalline seeds have a specific surface area of at least 60 square meters per gram.

28. A process according to claim 27, wherein said seeds are alpha alumina.

29. A process according to claim 26, wherein said seeds are alpha alumina.

30. A process according to claim 25, wherein said seeds are alpha alumina.

31. A process according to claim 24, wherein said seeds are alpha alumina.

32. A process according to claim 31, wherein said monohydrated alumina is boehmite.

33. A process according to claim 30, wherein said monohydrated alumina is boehmite.

34. A process according to claim 29, wherein said monohydrated alumina is boehmite.

35. A process according to claim 28, wherein said monohydrated alumina is boehmite.

36. A process according to claim 32, wherein at least one half of said powdered zirconia is in the tetragonal crystal form.

37. A process according to claim 36, wherein at least one fifth of said powdered zirconia is in the monoclinic crystal form.

* * * * *